United States Patent
Adler et al.

(10) Patent No.: US 10,928,236 B2
(45) Date of Patent: Feb. 23, 2021

(54) DOSING A FLUID AT A VOLUME OF LESS THAN ONE MILLILITER

(71) Applicant: HOFFMANN-LA ROCHE INC., Little Falls, NJ (US)

(72) Inventors: Michael Adler, Loerrach (DE); Karoline Bechtold-Peters, Riehen (CH); Adeline Boillon, Grasswil (CH); Anke Dorn, Kandern (DE); Joerg Luemkemann, Loerrach (DE); Denis Luthringer, Ruelisheim (FR); Hanns-Christian Mahler, Basel (CH); Alexander Meyer, Roth (DE)

(73) Assignee: HOFFMANN-LA ROCHE INC., Little Falls, NJ (US)

( * ) Notice: Subject to any disclaimer, the term of this patent is extended or adjusted under 35 U.S.C. 154(b) by 373 days.

(21) Appl. No.: 15/328,907

(22) PCT Filed: Jul. 23, 2015

(86) PCT No.: PCT/EP2015/066940
§ 371 (c)(1),
(2) Date: Jan. 25, 2017

(87) PCT Pub. No.: WO2016/012567
PCT Pub. Date: Jan. 28, 2016

(65) Prior Publication Data
US 2017/0211959 A1    Jul. 27, 2017

(30) Foreign Application Priority Data

Jul. 25, 2014  (EP) ................................... 14178651

(51) Int. Cl.
*G01F 11/12* (2006.01)
*G01F 11/02* (2006.01)
(Continued)

(52) U.S. Cl.
CPC ............ *G01F 11/125* (2013.01); *F04B 13/00* (2013.01); *F04B 19/006* (2013.01);
(Continued)

(58) Field of Classification Search
CPC ...... F04B 43/082; F04B 43/095; F04B 43/12; F04B 13/00; F04B 19/006; F04B 43/09;
(Continued)

(56) References Cited

U.S. PATENT DOCUMENTS 4,014,318 A * 3/1977 Dockum ............. A61M 1/1053
                                                    600/16
5,099,959 A    3/1992 Sciard
(Continued)

FOREIGN PATENT DOCUMENTS

DE    102005046516 A1    4/2007
GB         1450879 A     9/1976
(Continued)

OTHER PUBLICATIONS

Notice of Reasons for Refusal issued in Japanese Application No. 2017-504063, dated Jun. 3, 2019.
(Continued)

*Primary Examiner* — Dominick L Plakkoottam
(74) *Attorney, Agent, or Firm* — Medler Ferro Woodhouse & Mills PLLC

(57) ABSTRACT

A peristaltic dosing device for providing dosages of a fluid at a volume of less than one milliliter comprises: a flexible tube, a counter pressure element, a plurality of actors and a drive. The flexible tube is essentially straightly arranged along the counter pressure element thereby forming a longitudinal axis. The actors arranged parallel to each other along the longitudinal axis. They are moveable by the drive in relation to the flexible tube. The flexible tube is compressible between the actors and the counter pressure ele-
(Continued)

ment by moving the actors. Each of the actors is independently and linearly moveable by the drive along an actuation axis essentially perpendicular to the longitudinal axis of the flexible tube from a home position in which the flexible tube is least compressed to an end position in which the flexible tube is compressed and sealed between the respective actor and the counter pressure element. The peristaltic dosing device according to the invention allows for exactly and repeatably providing dosages at comparably small volumes in a sterile environment.

14 Claims, 4 Drawing Sheets

(51) Int. Cl.
    *F04B 43/08*     (2006.01)
    *F04B 43/12*     (2006.01)
    *F04B 13/00*     (2006.01)
    *F04B 19/00*     (2006.01)
    *F04B 43/09*     (2006.01)
    *G01F 11/00*     (2006.01)
    *B65B 3/00*     (2006.01)

(52) U.S. Cl.
    CPC .......... *F04B 43/082* (2013.01); *F04B 43/095* (2013.01); *F04B 43/12* (2013.01); *G01F 11/00* (2013.01); *G01F 11/02* (2013.01); *B65B 3/003* (2013.01)

(58) Field of Classification Search
    CPC ........ G01F 11/125; G01F 11/00; G01F 11/02; B65B 3/003; B65B 3/04
    See application file for complete search history.

(56) References Cited

U.S. PATENT DOCUMENTS

| | | | | |
|---|---|---|---|---|
| 5,165,873 A | * | 11/1992 | Meijer | A61M 5/14228 417/474 |
| 5,798,600 A | * | 8/1998 | Sager | F04B 17/003 310/328 |
| 6,213,739 B1 | * | 4/2001 | Phallen | F04B 13/02 417/474 |
| 6,558,347 B1 | * | 5/2003 | Jhuboo | A61M 5/14228 604/151 |
| 7,643,048 B2 | * | 1/2010 | Chino | B41J 2/445 347/224 |
| 7,900,850 B2 | * | 3/2011 | Zengerle | B01L 3/0268 239/11 |
| 8,337,168 B2 | * | 12/2012 | Rotem | F04B 43/12 417/53 |
| 8,920,144 B2 | * | 12/2014 | Rotem | F04B 49/06 417/477.7 |
| 9,039,389 B2 | * | 5/2015 | Banister | F04B 43/09 417/322 |
| 2007/0194045 A1 | * | 8/2007 | Py | B65B 39/004 222/105 |
| 2008/0169045 A1 | | 7/2008 | Tribble et al. | |
| 2008/0304982 A1 | * | 12/2008 | Miyazaki | F04B 19/006 417/412 |
| 2010/0278667 A1 | | 11/2010 | Gault et al. | |
| 2014/0356193 A1 | * | 12/2014 | Nzike | F04B 43/082 417/53 |
| 2015/0047404 A1 | * | 2/2015 | De Luca | F15B 21/008 72/245 |

FOREIGN PATENT DOCUMENTS

| | | | | |
|---|---|---|---|---|
| JP | 62-135183 A | 6/1987 | | |
| JP | 62-502190 A | 8/1987 | | |
| JP | 2008-081293 A | 4/2008 | | |
| JP | 2010-261448 A | 11/2010 | | |
| JP | 2013-215588 A | 10/2013 | | |
| RU | 2065996 C1 | 8/1996 | | |
| WO | 2004/026695 A2 | 4/2004 | | |
| WO | 2006056986 | 6/2006 | | |
| WO | 2013041703 | 3/2013 | | |
| WO | WO-2013041703 A1 | * | 3/2013 | ............ F04B 43/082 |

OTHER PUBLICATIONS

International Search Report and Written Opinion dated Jun. 11, 2015 in PCT/EP2015/066940.
Office Action issued by the European Patent Office dated Oct. 16, 2020 for corresponding EP Patent Application No. 15741211.5.

* cited by examiner

DOSING A FLUID AT A VOLUME OF LESS THAN ONE MILLILITER

TECHNICAL FIELD

The present invention relates to a peristaltic dosing device according to the preamble of independent claim 1 and more particularly to a filling apparatus with such a dosing device and a filling method using such a peristaltic dosing device.

Such peristaltic dosing devices comprising a flexible tube, a counter pressure element, a plurality of actors and a drive, wherein the flexible tube is arranged along the counter pressure element, the actors are moveable by the drive in relation to the flexible tube, and the flexible tube is compressible between the actors and the counter pressure element by moving the actors can be used for providing dosages of a fluid at a volume of less than one milliliter.

BACKGROUND ART

In many modern industrial and research applications such as in chemical or pharmaceutical applications fluids are to be dosed at comparably small volumes, i.e. at volumes of less than one milliliter. Thereby, it is often required that dosing can be performed under sterile conditions and that even small deviations in dosage can be prevented for economic or therapeutic or other reasons.

For dosing liquids at comparably small volumes various different systems and devices are used. For example, rotary or piston pumps are known in which a defined volume of liquid is sucked into a cylinder and pushed forward by a moving piston. However, beyond others such pumps apply a comparably high stress to the liquid or the substances in the liquid which makes these kind of pumps unsuitable for many applications. For example, proteins are comparably susceptible for surface or mechanical stress such that piston pumps usually are nor preferred in applications where proteins are comprised in the liquid to be dosed.

More gentle dosing can be performed by using a radial peristaltic pump. In such pumps a flexible tube is arranged along a curved surface of a counter pressure element. These pumps usually comprise a number of actors or rollers being arranged on a wheel. The rollers are positioned in a distance to the counter pressure element adjusted such that the flexible tube is compressed when lying between the actor and the counter pressure element. By turning the wheel the rollers are moved along the counter pressure element thereby forwarding a compression of the flexible tube along the counter pressure element. Together with the compression also an amount of liquid is forwarded inside the flexible tube wherein the volume of forwarded liquid can be defined by the distance between the rollers and the size of the tube.

In such radial peristaltic pumps the sidewalls of the flexible tubes typically are not only radially moved in relation to each other by the rollers but to a certain extent also longitudinally or tangentially. Thereby, the sidewalls are under additional stress which may lead to abrasion of tubing material into the liquid or fluid. Particularly in pharmaceutical applications such abrasion and contamination of the liquid can be inacceptable.

Furthermore, known radial peristaltic pumps often are precise for dosing volumes up to as few as 700 μl. However, in more and more applications dosages of smaller volumes are desired such that known radial peristaltic pumps do not suffice.

Still further, maintenance of known radial peristaltic pumps often is comparably cumbersome. For example, when the flexible tube is to be replaced the pump has to be dissembled, i.e. the counter pressure element has to be removed from the wheel with its rollers. When the tube is no longer clamped between the rollers and the counter pressure element it can be removed and a new tube can be inserted. After insertion the counter pressure element and the rollers have to be precisely positioned with regard to each other in order to allow proper operation of the pump.

Therefore, there is a need for a automated system being capable of gently and precisely dosing a fluid at volumes of less than one milliliter.

DISCLOSURE OF THE INVENTION

According to the invention this need is settled by a peristaltic dosing device as it is defined by the features of independent claim 1, by a filling apparatus as it is defined by the features of independent claim 11 and by a filling method as it is defined by the features of independent claim 14. Preferred embodiments are subject of the dependent claims.

In particular, the gist of the invention is the following: A peristaltic dosing device for providing dosages of a fluid at a volume of less than one milliliter, comprises a flexible tube, a counter pressure element, a plurality of actors and a drive. The flexible tube is arranged along the counter pressure element. The actors are moveable by the drive in relation to the flexible tube and the flexible tube is compressible between the actors and the counter pressure element by moving the actors. The flexible tube further is essentially straightly arranged along the counter pressure element thereby forming a longitudinal axis. The actors are arranged parallel to each other along the longitudinal axis of the flexible tube. Each of the actors is independently and linearly moveable by the drive along an actuation axis essentially perpendicular to the longitudinal axis of the flexible tube from a home position in which the flexible tube is open for the fluid to pass to an end position in which the flexible tube is compressed and sealed.

In the context of the invention, the term "peristaltic" can relate to a transverse or radial contraction and relaxation of a hollow flexible longitudinal element such as the flexible tube allowing to propagate a wave along the element. Generally, peristalsis is for example found in the contraction of smooth muscle tissue to propel food/chyme through a digestive tract such as the human gastrointestinal tract. The principle of peristalsis is also implemented in pumps for forwarding fluids in tubes.

The term "dosage" as used herein can relate to the provision of an exact predefined amount of the fluid. It can particularly relate to the provision of small volumes of less than 100 microliter (μl) such as 50 μl or 25 μl. The peristaltic dosing device according to the invention has proven to be suitable for precisely providing dosages of a volume of as low as 10 μl.

The term "fluid" as used herein can relate to any substance that continually deforms or flows under an applied shear stress. Thus, it can relate to gases, powder or granular substances and particularly to liquids.

The counter pressure element of the peristaltic dosing device can be a fixed element having a guidance for the flexible tube. In particular, the flexible tube can be arranged in or along the guidance of the counter pressure element. The guidance can be or comprise a flat surface facing the flexible tube and allowing the latter to be straightly arranged. By arranging the flexible tube in a straight manner the peristaltic dosing device can be a linear peristaltic dosing device. When any of the actors act on or push the flexible tube the counter pressure element fixedly stays in its original position such that the flexible tube is compressed in between the actor and the counter pressure element.

The flexible tube can have an inner diameter of about 200 µm to about 1,000 µm, or of about 300 µm to about 900 µm, or about 500 µm to about 800 µm. Such tubes can be suitable for providing dosages with the device according to the invention at intended volumes.

The actors of the peristaltic dosing device can be cubical blocks or other similar bodies having a face for acting on the flexible tube. The face can be flat and can have a width in a range 50 micrometer (µm) to 1,000 µm or in a range of 100 µm and 700 µm or in range of 200 µm and 500 µm. The actors can have a maximum stroke, i.e. the length between its home position and its end position, of about 800 µm, or about 600 µm, or about 500 µm, or about 400 µm, or about 300 µm. Such actors can be suitable for providing dosages in the device according to the invention at intended volumes.

The term "compress" as used herein can relate to an elastic deformation of the tube. Particularly, it can relate to elastically moving the side walls of the flexible tube into the direction of each other, i.e. into a transversal or radial direction, thereby narrowing or closing the inner duct of the flexible tube. In this context, the term "seal" can relate to compress the flexible tube to such an extent that essentially no fluid can pass the inner duct of the flexible tube.

In connection to the home position of the actors the flexible tube is open for the fluid to pass in the sense that the fluid can flow through the inner duct of the flexible tube. This can be best possible in a situation where the respective actuator is moved to a maximum possible distance from the counter pressure element such that the flexible tube is least compressed.

The peristaltic dosing device according to the invention allows for exactly and repeatably providing dosages at comparably small volumes in a sterile environment. It is particularly suitable to be used in an industrial dosage or filling process line. It can be used for aseptically dosing parenteralia at volumes less than 1 ml such as up to 25 µl or 50 µl or even 10 µl, e.g., in a pharmaceutical filling process. Compared to other peristaltic dosage systems such as radial peristaltic pumps the peristaltic dosing device according to the invention allows for a minimal or reduced stress at the inner surface of the flexible tube such that abrasion can be minimized or even eliminated. Particularly in pharmaceutical applications such abrasion advantageously is to prevent.

Further, since the flexible tube is straightly arranged when being pumped, the peristaltic dosing device is suitable for fluids having a broad variety of viscosities. Particularly, fluids having a comparably high viscosity can also be dosed with the peristaltic dosing device. The use of actors for pumping or forwarding the fluid allows the peristaltic dosing device to be comparably independent from pressure conditions in a system providing the fluid to the peristaltic dosing device and particularly providing it into its flexible tube. For example, the peristaltic dosing device can also be rather independent from the hydrostatic pressure variations around it.

Also, the inventive arrangement of the peristaltic dosing device allows for a comparably low maintenance effort and easy handing. For example, cleaning the device and replacing the flexible tube can comparably easily be performed. The peristaltic dosing device can comparably easily be manufactured at a comparably low weight. This allows for flexibly using it and for assisting the easy handling.

The drive of the peristaltic dosing device can be a stepper motor or servomotor which allows for precisely advancing or moving the actors. Alternatively, the drive comprises a piezoelectric actuation. Piezoelectric actuation allows for precisely end flexibly moving the actors such that various dosage schemes can be implemented in the peristaltic dosing device. The arrangement of the drive with the piezoelectric actuation makes it possible that the drive is embodied with comparably few and simple parts. Thus, it can be comparably robust and require comparably low maintenance effort.

Preferably, the plurality of actors is a series of three to fifteen or five to thirteen or seven to eleven parallel actors. Such a series of parallel actors allows for flexibly applying various tube compression schemes in the peristaltic dosing device. Like this, it is possible to provide a pumping or dosing mechanism which is adapted to the given conditions such as the viscosity of the fluid, the pressure conditions around the peristaltic dosing device, the stress resistance of the fluid and the like.

Preferably, the peristaltic dosing device comprises a tube fixation structure for releasably fixing the flexible tube in the essentially straight position along the counter pressure element. The term "releasably" as used herein can relate to an arrangement intended and having appropriate means for releasing and replacing the flexible tube. By releasably fixing the flexible tube in the peristaltic dosing device the flexible tube can be conventionally replaced. This particularly allows for using disposable flexible tubes.

Thereby, the tube fixation structure preferably comprises an extension jacket wherein one of the longitudinal ends of the flexible tube is fixed in the extension jacket. Such extension jackets are also known as Chinese finger traps. The extension jacket allows for a convenient and efficient releasable fixation of the flexible tube. In particular, the flexible tube can be sufficiently fixed in the extension jacket without any substantial compression.

Preferably, the flexible tube is manufactured from a disposable material. Disposable flexible tubes can be helpful in applications of the peristaltic dosing device where the fluid is frequently changed. In particular, when a new fluid is dosed the flexible tube is replaced and the previous flexible tube is discarded. This allows for an efficient prevention of a cross-contamination from one fluid to another.

The flexible tube can particularly be made of a material suitable for an aseptic application, for example with steam sterilization. Such a material can be silicone rubber, ethylene propylene diene monomer (EPDM) rubber, polypropylene (PP), polyethylene (PE), polyvinylchloride (PVC), butyl rubber or the like.

Preferably, the peristaltic dosing device comprises a fluid reservoir connected to one of the longitudinal ends of the flexible tube and a filling needle connected to the other one of the longitudinal ends of the flexible tube. The fluid reservoir can be any container suitable for holding and providing the fluid. It can also be pressurized for forwarding the fluid through the flexible tube. For that purpose the fluid reservoir can be equipped with or connected to a pressure regulation means such as a pressure pump or a pressurized gas overlay. Such an arrangement of the peristaltic dosing device allows for an efficient and precise dosing process.

Preferably, the flexible tube is partially pre-compressed between the plurality of actors and the counter pressure element when all actors of the plurality of actors are in their home positions. Such pre-compression allows the flexible tube to be fixed over a substantial length. In particular, it can prevent that the flexible tube is longitudinally moved in a section where the actors are applied. Like this a precise compression of the flexible tube is possible and stress of the side walls of the flexible tube in a longitudinal direction can be reduced or prevented. Furthermore, such pre-compression allows for predefining and adjusting a filling volume of the peristaltic dosage device. Thereby, the filling volume can be defined by the inner space of the flexible tube which lies between the actors and the counter pressure element. Beyond others, such adjustment of the filling volume allows for compensating an increasing deviation of the filling volume from its set point, e.g., induced by heating the fluid or softening of the flexible tube or tubing caused by mechanical stress.

Also, the peristaltic dosage device can comprise a control unit which is adapted to control the compression-force acting on the flexible tube to an essentially constant value. For that purpose, the control unit can be adapted to adjust the length of the path of the actuators, for example, by adjusting the pre-compression of the flexible tube of the peristaltic dosage device. With such a force control the dosage amount of fluid can precisely kept on a constant level over the time. In particular, changes of the properties of the material of the flexible tube over the time can be compensated. For example, over the time the material of the flexible tube can be worn by the mechanical stress of the milking movements of the actuators. In such a situation the rate of compression can decrease. By increasing the path of the actuators by adjusting the pre-compression of the flexible tube such decrease can be compensated such that the force can be kept constant.

The peristaltic dosage device can be made of any material that withstands the conditions inside the containment, such as required for hydrogen peroxide, cleaning agents, humidity, high temperatures during sterilization, low temperatures during filling of cooled product. The material preferably is mechanically stable and light. Such materials can for example be aluminum, anodized aluminum, stainless steel (316 L or 14435 or 14571), highly corrosion-resistant metal alloys also known as superalloys or high-performance alloys or Hastelloy, titanium, polyoxymethylene (POM), polyether ether ketone (PEEK) or polyetherketoneketone (PEKK). The material can have an elasticity modulus of at least 0.5 $kN/mm^2$.

A further aspect of the invention relates to a filling apparatus for automatically filling containers with dosages of a fluid at a volume of less than one milliliter. The filling apparatus comprises a container holder in which a number of containers is arrangeable for being filled and a set of peristaltic dosing devices as described above. It further comprises a dosing device positioner arranged to position the set of peristaltic dosing devices such that each peristaltic dosing device of the set of peristaltic dosing devices is arranged adjacent to one of the number of containers arranged in the container holder for filling the number of containers and to remove the set of peristaltic dosing devices from the container holder.

The containers can particularly in chemical or pharmaceutical applications be plastic or glass vials, ampoules, syringes or the like. The dosing device positioner can be an automation device such as a linear robot with two or three axis. By having the positioner for placing the single peristaltic dosing devices adjacent to the single containers the filling apparatus allows for bringing a point of dose comparably close to a point of fill. Like this, it can be prevented that deviations in the dosage volume occur between the dosing and the filling. Thus, the filling apparatus reduces the risk that what is dosed is not identical to what is filled. In particular in applications where even small deviations in filled volumes are to be prevented such as in pharmaceutical applications the filling apparatus allows for implementing an efficient and reliable filling process.

Preferably, the filling apparatus has outer surfaces manufactured from a sterilizable material. In particular, suitable sterilization can be achieved by a hydrogen peroxide treatment. Thus, the surfaces of the filling apparatus can be compatible with hydrogen peroxide. A filling apparatus having such surfaces allows for an efficient comparably easy sterilization of the system which, e.g., is required in pharmaceutical applications.

The filling apparatus preferably further comprises a conveyor for conveying the container holder along a line, wherein the dosing device positioner is arranged to convey the set of dosing devices adjacent to the container holder when each dosing device of the set of peristaltic dosing devices is positioned adjacent to one of the number of containers arranged in the container holder. The line along which the container holder conveyed can be curved or straight or the like. By conveying the peristaltic dosing devices together with the container holder the containers in the container holder can be filled while being conveyed. This can increase efficiency and speed of the complete filling process.

Another further aspect of the invention relates to a filling method for filling a container with a dosage of a fluid at a volume of less than one milliliter. The filling method comprises: providing a fluid in a flexible tube of a peristaltic dosing device as described above via a first longitudinal end of the flexible tube; a drive of the peristaltic dosing device moving at least one of the plurality of actors of the peristaltic dosing device to its end position such that the flexible tube is compressed and sealed; the drive moving another one of the plurality of actors of the peristaltic dosing device to an intermediate position being between its home position and its end position, wherein the at least one of the plurality of actors is closer to the first longitudinal end of the flexible tube than the other one of the plurality of actors; the drive moving the at least one of the plurality of actors from its end position at least partially into the direction of its home position such that fluid can pass the at least one of the plurality of actors through the flexible tube of the peristaltic dosing device; providing a dosage of the fluid out of a second longitudinal end of the flexible tube being opposite to the first longitudinal end of the flexible tube; the drive moving the at least one of the plurality of actors to its end position such that the flexible tube is compressed and sealed and provision of the fluid out of the second longitudinal end of the flexible tube is stopped; and the drive moving the other one of the plurality of actors of the peristaltic dosing device from its intermediate position to its home position.

By moving the other one of the actors to its home position after the dosage is provided and while the flexible tube is sealed, a negative pressure can be generated inside the flexible tube near its second longitudinal end. This can induce a sucking effect at the end of the flexible tube where the dosage is provided. By means of this sucking effect the fluid is retracted to a certain extend back into the flexible tube. Thereby, leakage of the fluid can be prevented such that precise dosing with comparably small deviations is possible. This can particularly be of importance in applications where exact volumes are to dosage and/or where comparably expensive fluids are dosed.

The filling method can further comprise a step of partially pre-compressing the flexible tube of the peristaltic dosage device. This allows for predefining and adjusting a filling volume of the peristaltic dosage device. Thereby, the filling volume can be defined by the inner space of the flexible tube which lies between the actors and the counter pressure element. Beyond others, such adjustment of the filling volume allows for compensating an increasing deviation of the filling volume, e.g., induced by heating the fluid.

Also, the filling method can further comprise a step of controlling a force acting on the flexible tube of the peristaltic dosage device to a constant value. For that purpose, the length of the path of the actuators of the peristaltic dosage device can be adjusted. Adjusting the length of the path can be performed by adjusting the pre-compression of the flexible tube of the peristaltic dosage device. With such a force control the dosage amount of fluid can precisely kept on a constant level over the time.

In particular, changes of the properties of the material of the flexible tube over the time can be compensated. For example, over the time the material of the flexible tube can be worn by the mechanical stress of the milking movements of the actuators. In such a situation the rate of compression can decrease. By increasing the path of the actuators by adjusting the pre-compression of the flexible tube such decrease can be compensated such that the force can be kept constant.

Preferably, the dosage of the fluid is provided out of the second longitudinal end of the flexible tube by applying an increased pressure inside the flexible tube in a region of its first longitudinal end. This allows for an efficient dosing when applying the filling method.

Still another further aspect of the invention relates to a use of a peristaltic dosage device as described above for transferring an aseptic fluid in dosages preferably at a volume few milliliters or of less than one milliliter. Such transfer of an aseptic can be applied in various pharmaceutical, chemical or medical applications. For example, the use can be applied in medical devices for dosing drugs or other liquids into patients. Or, the use can be applied in reconstitution of a freeze-dried drug product by dosing water to reconstitute a solution and by dosing the reconstituted solution to the patient.

Preferably, the fluid is a sterile drug product bulk solution and the transfer of the fluid comprises filling the fluid sterile drug product bulk solution into a primary packaging item. The primary packaging item can be a container such as a plastic or glass vial, an ampoules, a syringe, a blow fill seal container, an autoinjector or the like. Such use for filling can particularly be beneficial in pharmaceutical applications.

These and other aspects of the invention will be apparent from and elucidated with reference to the embodiment(s) described hereinafter.

BRIEF DESCRIPTION OF THE DRAWINGS

The peristaltic dosing device according to the invention, the filling apparatus according to the invention and the filling method according to the invention are described in more detail hereinbelow by way of exemplary embodiments and with reference to the attached drawings, in which.

DESCRIPTION OF EMBODIMENTS

In the following description certain terms are used for reasons of convenience and are not to be interpreted as limiting. The terms "right", "left", "up", "down", "top" and "bottom" refer to directions in the figures. The terminology comprises the explicitly mentioned terms as well as their derivations and terms with a similar meaning.

Figure 1:
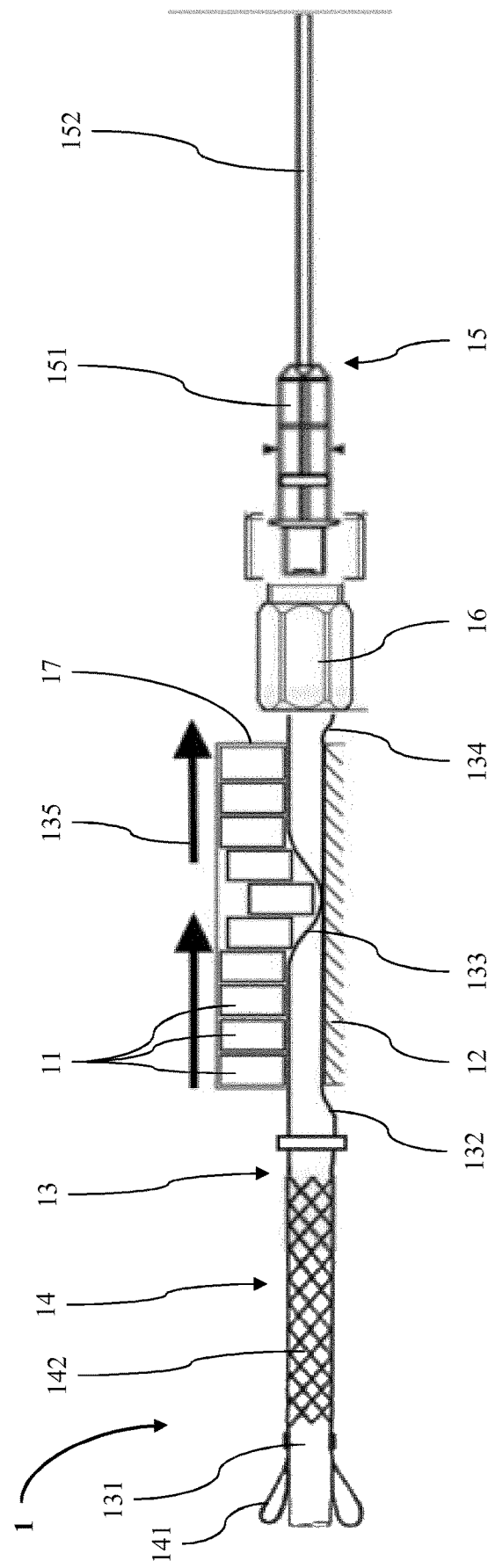
FIG. 1 shows a schematic view of a first embodiment of a peristaltic dosing device according to the invention.

FIG. 1 shows a first embodiment of a linear peristaltic dosing device 1 in accordance with the invention. The peristaltic dosing device 1 comprises a flexible tube 13, a tube extension jacket 14 as tube fixation structure, a counter pressure plate 12 as counter pressure element, a set of ten parallel piezoelectric actors 11, a dispensing needle 15 as filling needle and a piezoelectric drive unit 17 housing the actors 11 as drive. The tube extension jacket 14 has two straps 141 and a tubular net portion 142. A fixation section 131 of the flexible tube 13 projects through the net portion 142 of the tube extension jacket 14. On expanding the net portion 142, e.g. by pulling the straps 141, it narrows its interior and fixes the flexible tube 13.

Following the tube extension jacket 14 to the right the flexible tube 13 passes on in between a flat surface of the counter pressure plate 12 and actuation faces of the actors 11. The flat surface of the counter pressure plate 12 forms a guidance along which the flexible tube 13 is straightly arranged. Thus, the flexible tube 13 has a longitudinal axis extending in a longitudinal direction 135 which is identical to the direction of advancing the fluid. The counter pressure plate 12 is fixedly or immovably arranged relative to the flexible tube 13, the dispensing needle 15 and the drive unit 17.

The actors 11 are adjacently arranged in parallel such that their actuation faces constitute an essentially continuous front face directed to the flexible tube 13. The piezoelectric drive unit 17 can linearly move each of the actors 11 independently from each other in a stroke direction which is perpendicular to the longitudinal direction 135. The flexible tube 13 is pre-compressed in between the counter pressure plate 12 and the actors 11. For that reason, it has a narrowing section 132 between the tube extension jacket 14 and the counter pressure plate 12 and a widening section 134 between the counter pressure plate 12 and a cap nut 16 following the counter pressure plate 12 to the right. Like this, the flexible tube 13 is clamped and fixedly aligned with regard to the counter pressure plate 12 and the actors 11.

In FIG. 1 the four leftmost actors 11 and the three rightmost actors 11 are in a home position in which they are at a maximum distance to the counter pressure plate 12. The sixth actor 11 counted from the left which is the fifth actor 11 counted from the right is moved by the drive unit 17 into its end position in which a side of the wall of the flexible tube 13 contacting the actors 11 is transversally or radially pressed onto a side of the wall of the flexible tube 13 contacting the counter pressure plate 12. Thereby, the flexible tube 13 is elastically compressed and its inner duct is sealed such that so fluid can pass the actors 11. The two actors 11 neighboring the actor 11 which is in its end position are moved by the drive unit 17 in a position between their home positions and their end positions. Thereby, the moved actors induce a wave portion 133 on the flexible tube 13.

The widening section 134 of the flexible tube 13 passes over into the dispensing needle 15 which is fixed to the piezoelectric drive unit 17 and the counter pressure plate 12 via the cap nut 16. The dispensing needle 15 has a proximal or left-hand body portion 151 and a distal or right-hand pipe portion 152.

In use, the peristaltic dosing device can be operated in two modes or schemes for providing dosages of the fluid out of the open end of the pipe portion 152 of the dispensing needle 15. In a first path control mode, the actors 11 are identically moved one after the other. In a first step the leftmost actor 11 is moved to its end position and the right side neighboring actor 11 is partially moved into the direction of its end position. All the other actors 11 are in their home positions. In a second step the second leftmost actor 11 is moved to its end position and the two neighboring actors 11 are partially moved into the direction of their end position. All the other actors 11 are in their home positions. In a third step the third leftmost actor 11 is moved to its end position and the two neighboring actors 11 are partially moved into the direction of their end position. All the other actors 11 are in their home positions. This stepwise moving of the actors 11 is continued until in a tenth step the rightmost actor 11 is moved to its end position and the left side neighboring actor 11 is partially moved into the direction of its end position. All the other actors 11 are in their home positions. After the tenth step the process is restarted with the first step.

By moving the actors as described hereinbefore, a wave is generated in the side wall of the flexible tube 13. This wave pushes an exactly predefined volume of the fluid forward into the longitudinal direction 135 to the right. Thereby, the predefined volume of the fluid passes the dispensing needle 15 and exits the open end of the pipe portion 152. The overall volume of one single dosage can be defined by the number of cycles of generating the wave with the actors 11. It can also be less than one full cycle by running plural offset cycles at the same time.

In a second time-pressure control mode of operating the peristaltic dosing device 1, one or plural actors 11 are moved into the end position thereby sealing the flexible tube 13. Upstream the actors 11, the fluid is set under pressure. By moving the one or plural actors 11 back into the home position, the fluid is advanced by the overpressure into the longitudinal direction 135 to the right and out of the open end of the pipe portion 152 of the dispensing needle 15. After a specific time the one or plural actors 11 are moved again in the end position and the flexible tube 13 is sealed again.

In the time-pressure mode, the dispensed volume is predefined by the time the flexible tube 13 is open and by the pressure in the fluid upstream the actors 11. In a given diameter of the flexible tube 13, the higher the pressure and/or the longer the time are the larger the dispensed volume of fluid is.

The peristaltic dosing device 1 further comprises a control unit in which various parameters of operation can be set. General parameters of operation can comprise: number of actors 11, wave speed corresponding to the speed the steps of the actors 11 are advanced and dimension of the wave depending on the number and stroke of simultaneously moved actors 11, e.g. in percent of the path between home position and end position. Parameters specific for the path control mode can comprise: the path length the wave has to travel which, e.g., can be between 0.1 millimeter (mm) and 1,000 mm, the time in which the wave travels the path lengths which, e.g., can be between 1 millisecond (ms) and 10,000 ms. Parameter specific for the time-pressure mode can comprise: identification of the actor(s) 11 sealing the flexible tube, time the flexible tube 13 is opened for one single dosage and pressure of the fluid upstream the actors 11. The control unit monitors the parameters and controls the pressure and the actors 11 via the drive unit accordingly.

Figure 2:
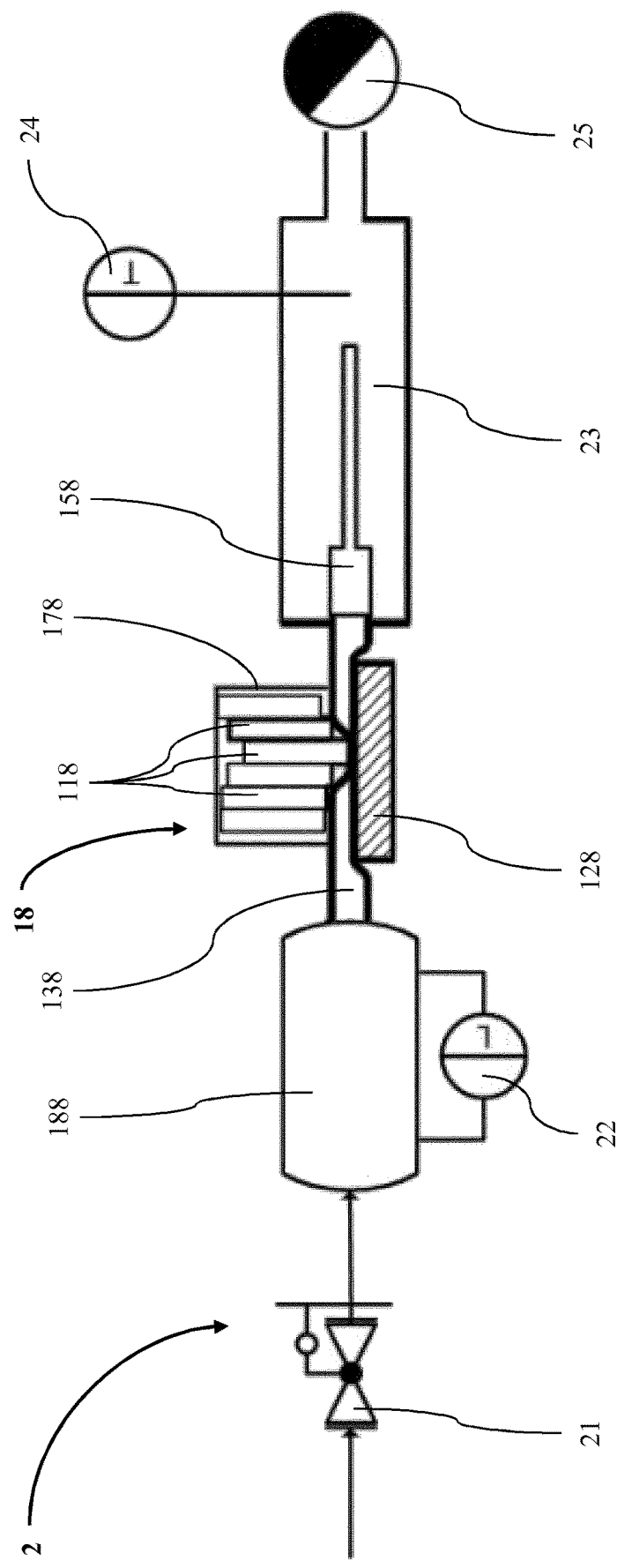
FIG. 2 shows a schematic view of an embodiment of a filling apparatus according to the invention comprising a second embodiment of a peristaltic dosing device according to the invention.

In FIG. 2 an embodiment of a filling apparatus 2 according to the invention having a second embodiment of a peristaltic dosing device 18 according to the invention is shown. The peristaltic dosing device 18 is similarly embodied as the peristaltic dosing device 1 shown in FIG. 1. It has a dispensing needle 158, a flexible tube 138, a counter pressure plate 128 as counter pressure element, a piezoelectric drive unit 178 housing six parallel piezoelectric actors 118 as drive and a control unit. The peristaltic dosing device 18 further comprises a tank 188 as fluid reservoir being connected to a right hand or upstream end of the flexible tube 138.

The filling apparatus 2 further comprises a pressure regulator 21 being connected to the tank 188. By means of the pressure regulator 21 a pressure of the fluid inside the tank 188 can be adjusted. The tank 188 is connected to a level sensor 22 sensing a filling level of the tank 188. By means of the level sensor 22 a fluid level of the tank 188 can be monitored and controlled by the control unit.

The dispensing needle 158 is positioned inside a needle container 23 to which a temperature gauge 24 and a condensation trap 25 are connected. By means of the needle container 23 a pressurizeable unit is built for steam sterilization. Thereby, clean steam, e.g. of a temperature above 121° C., can pass through the complete fluid path of the filling apparatus 2 for killing life microorganisms from the tank 188 to a open end of the dispensing needle 158. After leaving the dispensing needle 158, the stem fills the needle container 158 and also sterilizes the outer surface of the dispensing needle 158. Condensate that is developing from the steam is drained away from the needle container 23 towards the condensate trap 25 and discarded there. Like this, it can be made sure by applying the steam that a pressure of two bar is built up such that satisfactory sterilization conditions can be provided, e.g. over a time of fifteen minutes.

The filling apparatus 2 also comprises a vial holder as container holder and a linear robot as dosing device positioner. The linear robot is arranged to position the needle container 23 together with the peristaltic dosing device 18 adjacent to a vial held by the vial holder. Like this, the linear robot allows to bring a point of dose close to a point of fill which makes a very precise filling or dosing possible.

Figure 3:
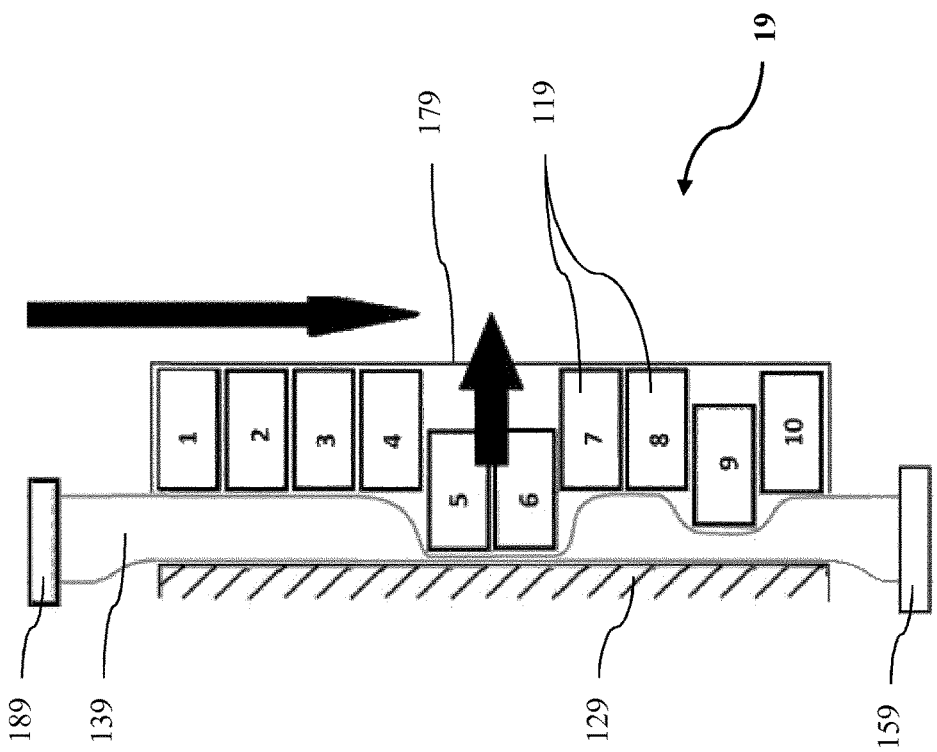
FIG. 3 shows a schematic view of a third embodiment of a peristaltic dosing device according to the invention in a first state within a filling method according to the invention.

FIG. 3 shows a third embodiment of a peristaltic dosing device 19 according to the invention being operated in an embodiment of a filling method according to the invention. The peristaltic dosing device 19 is similarly embodied as the peristaltic dosing device 1 shown in FIG. 1 and the peristaltic dosing device 18 shown in FIG. 2. In a downstream or top-down direction the peristaltic dosing device 19 comprises a fluid reservoir 189 being connected to a top longitudinal end of a flexible tube 139. The reservoir 189 holds a fluid to dose at an elevated pressure. The flexible tube 139 extends between a counter pressure plate 129 and a ten parallel actors 119, wherein the flexible tube 139 is precompressed between the counter pressure plate 129 and the actors 119. The ten actors are housed in a piezoelectric drive unit 179. At its bottom or downstream longitudinal end the flexible tube 139 is connected to a dispensing needle 159. The ten actors 119 are numbered in FIG. 1 from top or upstream first actor 119 to bottom or downstream tenth actor 119.

In FIG. 3 the peristaltic dosing device 19 is shown in an early stage of the filling method in which the fifth and the sixth actors 119 are moved by the piezoelectric drive unit 179 into their end positions. Thereby, these two actors 119 seal the flexible tube 139 such that, as indicated by the top arrow, the fluid can only advance up to the fifth actor 11. Additionally, the ninth actor 119 is moved by the drive unit 179 into an intermediate position which lies in between the home and end positions. In the intermediate position the ninth actor 119 slightly compresses the flexible tube 139 without preventing that fluid can pass.

The following applies to the rest of this description. If, in order to clarify the drawings, a figure contains reference signs which are not explained in the directly associated part of the description, then it is referred to previous description sections.

Figure 4:
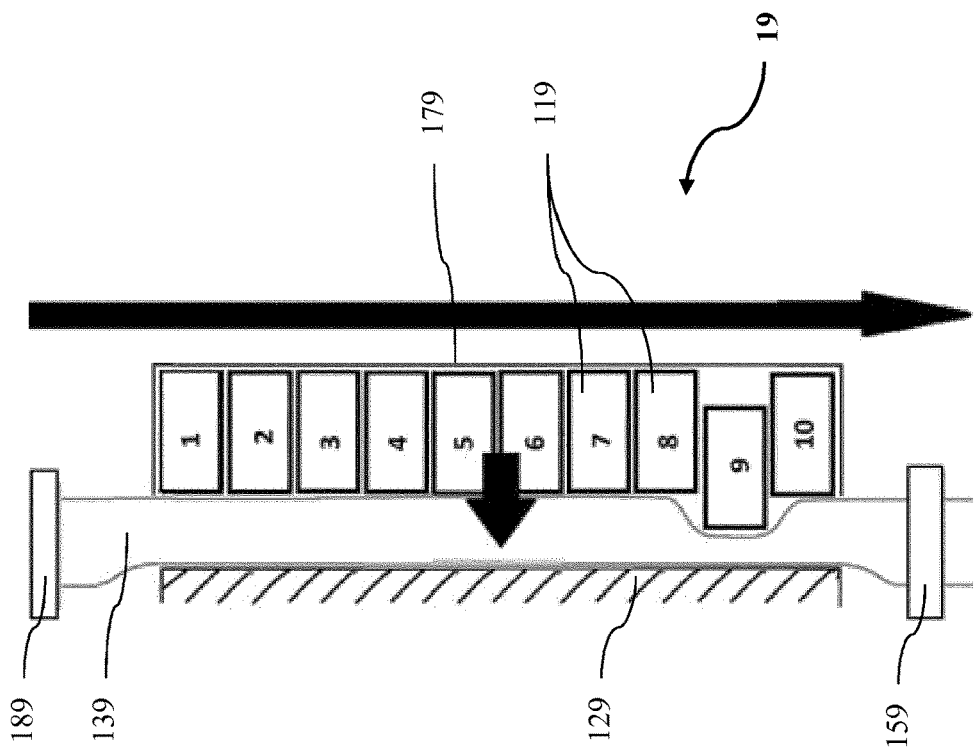
FIG. 4 shows a schematic view of the peristaltic dosing device of FIG. 3 in a second state within the filling method of FIG. 3.

FIG. 4 shows the peristaltic dosing device in a following stage of the filling method. Compared to the early stage shown in FIG. 3 the fifth and sixth actors 119 are moved into their home positions by the drive unit 179. The ninth actor 11 still is in its intermediate position. This allows the pressurized fluid to pass through the flexible tube 139 and the dispensing needle 159 into a container to be filled as indicated by the right hand arrow. The peristaltic dosing device is operated in a time-pressure mode as explained hereinbefore.

Figure 5:
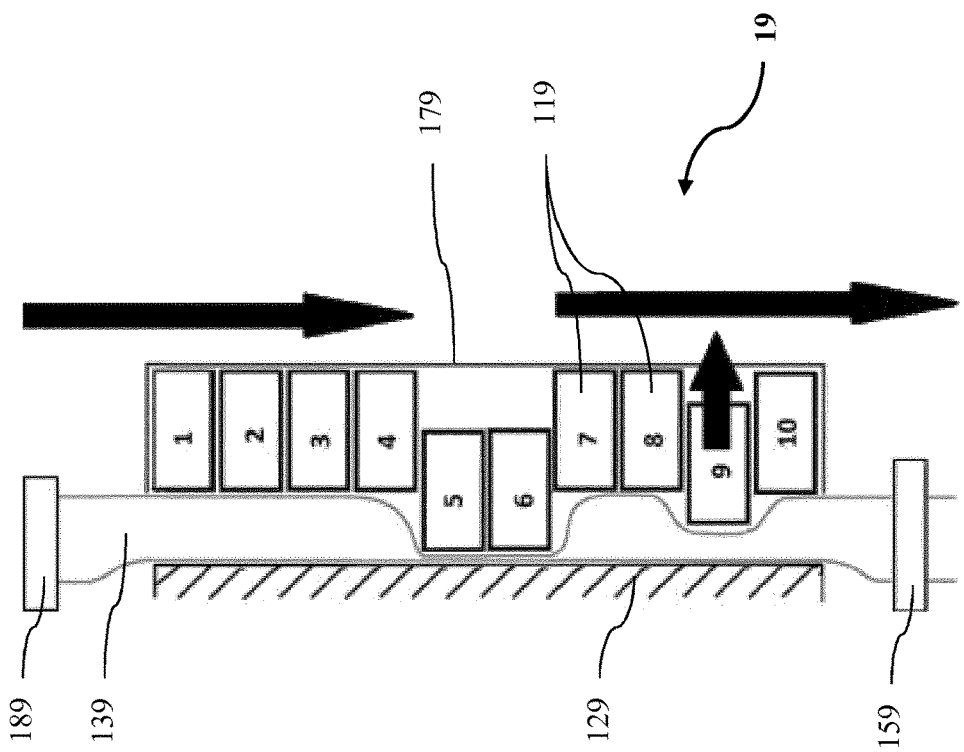
FIG. 5 shows a schematic view of the peristaltic dosing device of FIG. 3 in a third state within the filling method of FIG. 3.

As shown in FIG. 5, after a predefined time allowing a predefined amount of the fluid to be dispensed out of the dispensing needle 159, the fifth and the sixth actors 119 are moved into their end positions again. The ninth actor 11 still is in its intermediate position. Thereby, the flexible tube 139 is sealed again and the fluid may only advance up to the fifth actor 119.

Figure 6:
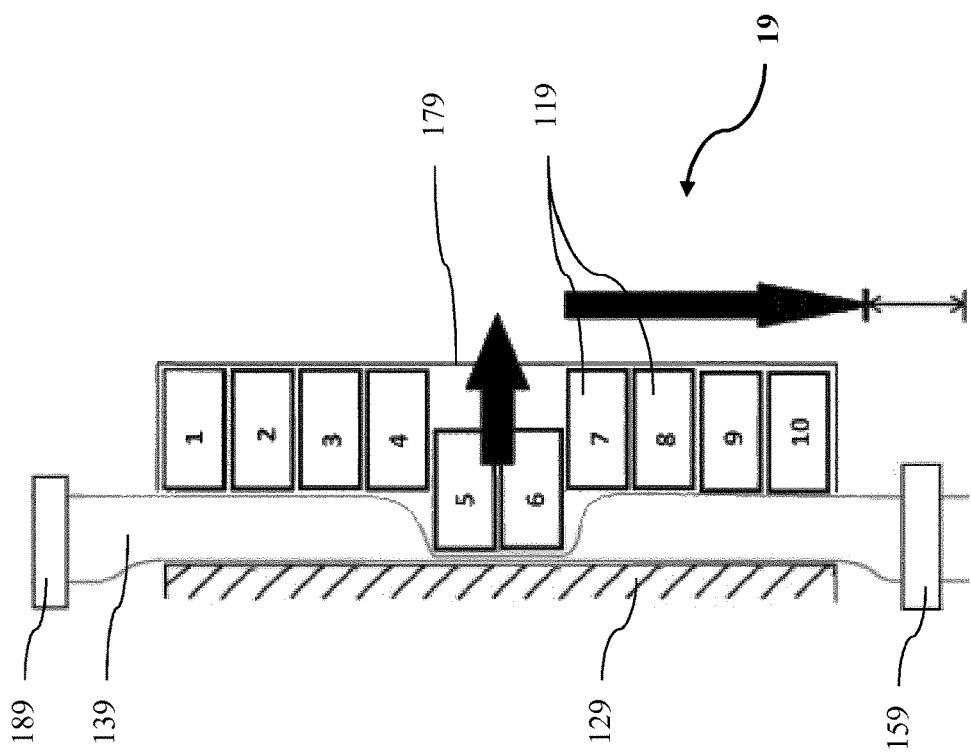
FIG. 6 shows a schematic view of the peristaltic dosing device of FIG. 3 in a fourth state within the filling method of FIG. 3.

In FIG. 6 the peristaltic dosing device 19 is shown in a last stage of the filling method. In this stage the ninth actor 119 is moved back into its home position by the drive unit 117. The fifth and sixth actors 119 still are in their end positions sealing the flexible tube 139. By moving the ninth actor back a negative pressure is induced in the lower part of the flexible tube 139. This results in a back sucking effect in the lower part of the flexible tube 139 which allows for preventing leakage and loss of fluid. For providing a next dosage of the fluid the filling method is repeated.

While the invention has been illustrated and described in detail in the drawings and foregoing description, such illustration and description are to be considered illustrative or exemplary and not restrictive. It will be understood that changes and modifications may be made by those of ordinary skill within the scope and spirit of the following claims. In particular, the present invention covers further embodiments with any combination of features from different embodiments described above and below.

The invention also covers all further features shown in the Figs. individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims ort the exemplary embodiments as well as subject matter comprising said features.

Furthermore, in the claims the word "comprising" does not exclude other elements or steps, and the indefinite article "a" or "an" does not exclude a plurality. A single unit or step may fulfill the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. The term "about" in the context of a given numerate value or range refers to a value or range that is, e.g., within 20%, within 10%, within 5%, or within 2% of the given value or range. Any reference signs in the claims should not be construed as limiting the scope.

The invention claimed is:

1. A peristaltic dosing device for providing dosages of a fluid at a volume of less than one milliliter, comprising:
   a flexible tube, a counter pressure element, a plurality of actors, and a drive, wherein
      the flexible tube is arranged along the counter pressure element,
      the plurality of actors are moveable by the drive in relation to the flexible tube, and
      the flexible tube is compressible between the plurality of actors and the counter pressure element by moving the plurality of actors,
      the flexible tube is essentially straightly arranged along the counter pressure element thereby forming a longitudinal axis,
      the plurality of actors are arranged parallel to each other along the longitudinal axis of the flexible tube, and
      each actor of the plurality of actors is independently and linearly moveable by the drive along an actuation axis essentially perpendicular to the longitudinal axis of the flexible tube between
         a home position in which the respective actor is at a distance from the counter pressure element such that the flexible tube is open for a fluid to pass, and
         an end position in which the flexible tube is compressed and sealed by the respective actor,
      wherein when all actors of the plurality of actors are aligned in their home positions the flexible tube is partially pre-compressed between the plurality of actors and the counter pressure element, and
      wherein the pre-compression of the flexible tube when all actors of the plurality of actors are aligned in their home positions defines a filling volume of the peristaltic dosage device, whereby the filling volume is defined by an inner volume of the flexible tube which lies between the plurality of actors in their home positions and the counter pressure element.

2. The peristaltic dosing device according to claim 1, wherein the drive comprises a piezoelectric actuation.

3. The peristaltic dosing device according to claim 1, wherein the plurality of actors is a series of three to fifteen or five to thirteen or seven to eleven parallel actors.

4. The peristaltic dosing device according to claim 1, further comprising:
   a tube fixation structure for releasably fixing the flexible tube in the essentially straight position along the counter pressure element.

5. The peristaltic dosing device according to claim 4, wherein the tube fixation structure comprises an extension jacket wherein one of the longitudinal ends of the flexible tube is fixed in the extension jacket.

6. The peristaltic dosing device according to claim 1, wherein the flexible tube is manufactured from a disposable material.

7. The peristaltic dosing device according to claim 1, further comprising:
a fluid reservoir connected to one of the longitudinal ends of the flexible tube and a filling needle connected to the other one of the longitudinal ends of the flexible tube.

8. A filling apparatus for automatically filling containers with dosages of a fluid at a volume of less than one milliliter, comprising:
a container holder in which a number of containers are arrangeable for being filled,
a set of peristaltic dosing devices according to claim 1, and
a dosing device positioner arranged to position the set of peristaltic dosing devices such that each peristaltic dosing device of the set of peristaltic dosing devices is arranged adjacent to one of the number of containers arranged in the container holder for filling the number of containers and to remove the set of peristaltic dosing devices from the container holder.

9. The filling apparatus according to claim 8, having surfaces manufactured from a sterilizable material.

10. The filling apparatus according to claim 8, further comprising: a conveyor for conveying the container holder along a line, wherein the dosing device positioner is arranged to convey the set of peristaltic dosing devices adjacent to the container holder when each peristaltic dosing device of the set of peristaltic dosing devices is positioned adjacent to one of the number of containers arranged in the container holder.

11. A filling method for filling a container with a dosage of a fluid at a volume of less than one milliliter, comprising:
providing a fluid in a flexible tube of a peristaltic dosing device according to claim 1 via a first longitudinal end of the flexible tube,
a drive of the peristaltic dosing device moving at least one of the plurality of actors of the peristaltic dosing device to its end position such that the flexible tube is compressed and sealed,
the drive moving another one of the plurality of actors of the peristaltic dosing device to an intermediate position being between its home position and its end position, wherein the at least one of the plurality of actors is closer to the first longitudinal end of the flexible tube than the other one of the plurality of actors,
the drive moving the at least one of the plurality of actors from its end position at least partially into the direction of its home position such that fluid can pass the at least one of the plurality of actors through the flexible tube of the peristaltic dosing device,
providing a dosage of the fluid out of a second longitudinal end of the flexible tube being opposite to the first longitudinal end of the flexible tube,
the drive moving the at least one of the plurality of actors to its end position such that the flexible tube is compressed and sealed and provision of the fluid out of the second longitudinal end of the flexible tube is stopped, and
the drive moving the other one of the plurality of actors of the peristaltic dosing device from its intermediate position to its home position.

12. The filling method according to claim 11, wherein the dosage of the fluid is provided out of the second longitudinal end of the flexible tube by applying an increased pressure inside the flexible tube in a region of its first longitudinal end.

13. A use of a peristaltic dosage device according to claim 1 for transferring an aseptic fluid in dosages.

14. The use according to claim 13, wherein the aseptic fluid is a sterile drug product bulk solution and the transfer of the aseptic fluid comprises filling the sterile drug product bulk solution into a primary packaging item.

* * * * *